Aug. 4, 1925.
E. S. EVANS
1,548,672
AXLE HOLDDOWN
Filed April 24, 1923
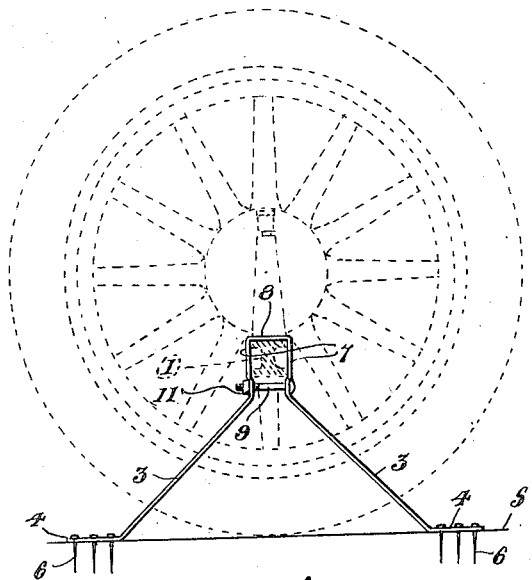
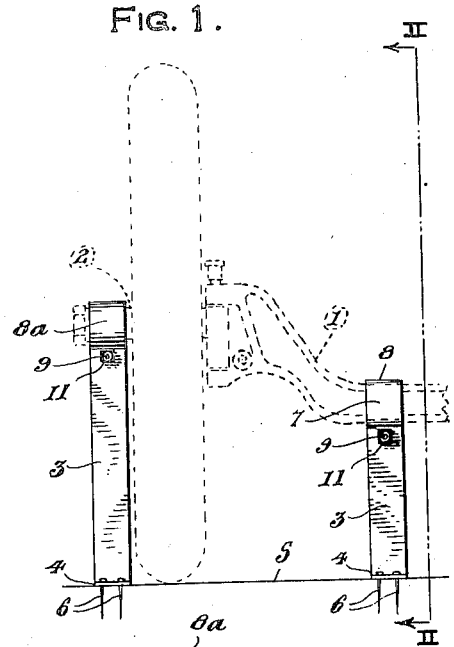
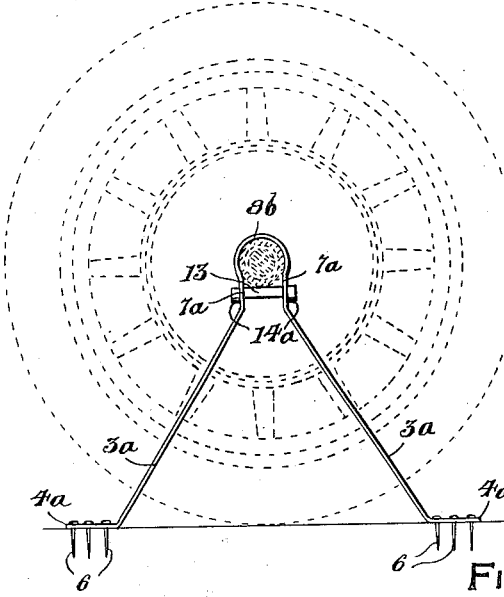
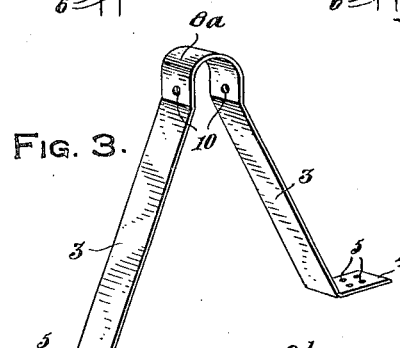
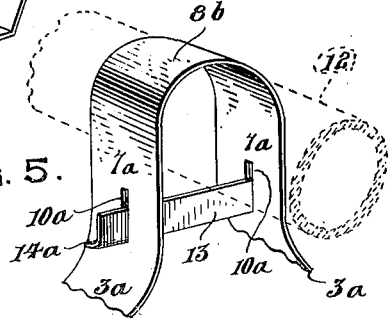
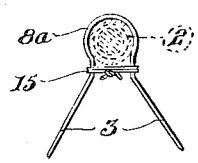
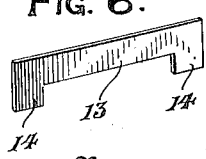
Inventor
Edward S. Evans
By F. K. Bryant
Attorney Patented Aug. 4, 1925.

1,548,672

UNITED STATES PATENT OFFICE.

EDWARD S. EVANS, OF DETROIT, MICHIGAN.

AXLE HOLDDOWN.

Application filed April 24, 1923. Serial No. 634,275.

*To all whom it may concern:*

Be it known that I, EDWARD S. EVANS, a citizen of the United States of America, residing at Detroit, in the county of Wayne and State of Michigan, have invented certain new and useful Improvements in Axle Holddowns, of which the following is a specification.

This invention relates to certain new and useful improvements in axle hold-downs and is designed for association with an automobile axle or wheel hub to anchor the automobile to the floor of a shipping support and is generally employed in connection with loading or chock blocks and the like.

The invention has for its primary object to provide an axle or wheel hub hold-down that is first anchored to the floor of a shipping support, such as a flat car floor and is subsequently locked to the automobile axle or wheel hub permitting the same to be drawn into a taut or rigid condition providing a fixed support or hold-down and being of a design to prevent longitudinally shifting movement usually present in flexible hold-down devices of this general character.

With the above and other objects in view as the nature of the invention is better understood, the same consists of the novel form, combination and arrangement of parts hereinafter more fully described shown in the accompanying drawing and claimed.

In the drawing, wherein like reference characters designate corresponding parts throughout the several views, Figure 1 shows by dotted lines, a front elevational view of one end of an automobile axle and supporting wheel with an axle and wheel hub hold-down device anchoring the axle and wheel hub to a shipping support.

Figure 2 is a vertical cross-sectional view taken on line II—II of Fig. 1 showing the inverted substantially V-shaped hold-down with the upper end thereof overlying the axle and clamped beneath the same.

Figure 3 is a perspective view of the hold-down,

Figure 4 is a side elevational view of the hold-down showing a modified form of locking means for securing the upper end of the hold-down to the rear axle housing of an automobile, Figure 5 is a fragmentary perspective view showing the upper end of the hold-down and locking key with an axle housing confined therein and disposed above the locking key, Figure 6 is a perspective view of the locking key employed in the hold-down shown in Figs. 4 and 5, and Figure 7 is a fragmentary side elevational view of a hold-down showing another type of anchoring means in the form of a flexible wire.

The present type of hold-downs now generally employed in connection with loading blocks are either made of flat flexible metal or wire, some of which are crossed beneath an axle or wheel hub while the side legs of others extend vertically and parallel, but in hold-downs of this character, only vertically shifting movement is prevented, and the automobile is not restrained against longitudinally shifting movement. It is therefore the primary object of this invention to provide a rigid anchoring means or hold-down for the automobile that will prevent vertical or longitudinally shifting movements and is capable of use in conjunction with various other types of hold-downs or loading blocks, the initial anchoring of the lower ends of the hold-down upon a car support or the like permitting subsequent adjustment or tightening of the hold-down upon an automobile axle or wheel hub to insure the rigid mounting thereof, it being impossible to obtain sufficient rigidity in the hold-down when the same is first secured to an axle or wheel hub and later anchored to a car support. The legs of the holddown are anchored to the transportation support, respectively, forwardly and rearwardly of the engaged part of the automobile. Pulling strains are, therefore, placed on the holddown in the direction of movement of the transportation support which is longitudinally of the holddown, the holddown thereby resisting such pulling strains and assuring the rigid anchoring of the automobile.

Referring more in detail to the accompanying drawing, the hold-down devices illustrated in Figs. 1 to 3 are especially designed for association with the front axle 1 of I-beam formation and the circular hub 2 of the supporting wheel. The hold-down is formed from a sheet metal strip bent into inverted substantially 'V-shaped formation having upwardly converging side legs 3 with an angularly disposed foot 4 upon the lower ends thereof having openings 5 for the reception of nails 6 or the like. The strip from which the hold-down is formed being bent intermediate the ends thereof to provide the converging side legs 3, has the upper end thereof, as shown in Fig. 2, bent into a substantially rectangular formation embodying side arms 7 and an upper cross arm 8, the arms 7 and 8 inclosing the I-beam axle 1.

After positioning the hold-down upon the axle 1, the feet 4 thereof are anchored to the car support S and a clamping bolt 9 is passed through alined openings 10 formed in the side legs 7 at the upper end of the hold-down and beneath the axle 1 as shown in Figs. 1 and 2, the nut 11 upon the clamping bolt 9 binding the rectangular head of the hold-down upon the axle and also tightening or rendering taut the spaced side legs 3 of the hold-down with the result that the automobile is prevented from vertically shifting movement and also retained in a rigid condition against longitudinally shifting movement by the converging disposition of the side legs 3.

As illustrated in Fig. 1, two hold-downs may be associated with each end of the axle 1, one hold-down being directly attached thereto while the other hold-down has an arched head 8$^a$ as shown in Fig. 3 that encloses the wheel hub 2.

Another form of locking means for retaining the hold-down upon a circular axle 12 or rear axle housing is shown in Figs. 4 to 6, the side legs 3$^a$ of the hold-down having anchoring feet 4$^a$ at the lower ends thereof while the upper end of the hold-down is of arched formation as at 8$^b$ to inclose the axle or housing 12 as shown in Figs. 4 and 5. The connection between the upper ends of the converging side legs 3$^a$ and the arched portion 8$^b$ embodies parallel side portions 7$^a$ that are slotted as at 10$^a$ for the passage of a clamping key 13. The key 13 is in the form of a plate or bar having a depending lug 14 at each end thereof, the key 13 being inserted through the openings 10$^a$ in the side portions 7$^a$ of the hold-down beneath the axle or housing 12 with the lugs 14 subsequently bent as at 14$^a$, as shown in Fig. 5 to retain the key in locked association with the hold-down, the bent lugs 14$^a$ traversing the slotted openings 10$^a$.

Still another form of anchoring means for the hold-down is shown in Fig. 7 wherein a flexible wire is passed through openings at the upper ends of the side legs 3 beneath the axle, wheel hub or axle housing, tension upon the binding wire 15 moving the upper ends of the legs 3 toward each other to provide a rigid connection at the upper end of the hold-down with the engaged object. In each form of the invention, the holddown has its feet at opposite sides of the engaged part of the automobile and resisting strains placed on the holddown are in the direction of the length of the holddown.

From the above detail description of the invention it is believed that the construction and operation thereof will at once be apparent, it being noted that by first anchoring the feet of the hold-down to the car support S, subsequent adjustment or securing of the upper end of the hold-down upon the car axle or wheel hub provides a rigid mounting for the hold-down to prevent longitudinally shifting as well as vertical movement of the associated automobile, and while there are herein shown and described the preferred embodiments of the present invention, it is nevertheless to be understood that minor changes may be made therein without departing from the spirit and scope of the invention as claimed.

What is claimed as new is:—

1. In a hold-down for automobiles, a strap inclosing a part of an automobile and anchored at its lower ends to a transportation support at opposite sides of the engaged part of the automobile and in the line of pulling strains thereof, means for anchoring the upper end of the strap to the automobile part, said strap being of inverted substantially V-shaped formation and said means being positioned below the engaged part of the automobile and operated to place the hold-down under tension subsequent to the anchoring of the hold-down to a transportation support for rigidly supporting an automobile against vertical and longitudinal shifting movements.

2. In a hold-down for automobiles, a strap inclosing a part of an automobile and anchored at its lower ends to a transportation support at opposite sides of the engaged part of the automobile and in the line of pulling strains thereof, means for anchoring the upper end of the strap to the automobile part, said strap being of inverted substantially V-shaped formation including upwardly converging side legs, and said means being positioned below the engaged part of the automobile and adapted to draw the upper ends of the legs toward each other to render the same taut subsequent to the anchoring of the hold-down to the transportation support.

3. In a hold-down for automobiles, a strap inclosing a part of an automobile and anchored at its ends to a transportation support at opposite sides of the engaged part of the automobile and in the line of pulling strains thereof, means for anchoring the upper end of the strap to the automobile part, said strap being of inverted substantially V-shaped formation including upwardly converging side legs, and said means being positioned below the engaged part of the automobile and adapted to draw the upper ends of the legs toward each other subsequent to the anchoring of the hold-down to a transportation support to render the legs taut and to combine the upper end of the strap on the automobile part.

4. In a hold-down for automobiles, a strap inclosing a part of an automobile and anchored at its lower ends to a transportation support at opposite sides of the engaged part of the automobile and in the line of pulling strains thereof, means for anchoring the upper end of the strap to the automobile part, said strap being of inverted substantially V-shaped formation including upwardly converging side legs, said means being positioned below the engaged part of the automobile and adapted to draw the upper ends of the legs toward each other subsequent to the anchoring of the hold-down to the transportation support to render the legs taut and to combine the upper end of the strap on the automobile part, and the upper end of the strap being of a configuration similar to the engaged part of the automobile.

5. In a hold-down for automobiles, a strap inclosing a part of an automobile and anchored at its lower ends to a transportation support at opposite sides of the engaged part of the automobile and in the line of pulling strains thereof, means for anchoring the upper end of the strap to the automobile part, said strap being of inverted substantially V-shaped formation including upwardly converging side legs, said means being positioned below the engaged part of the automobile and adapted to draw the upper ends of the legs toward each other subsequent to the anchoring of the hold-down to the transportation support to render the legs taut and to combine the upper end of the strap in the engaged part of the automobile, and the upper end of the strap being of a configuration similar to the engaged part of the automobile, said means including a member extending through the upper ends of the spaced legs.

6. In a hold-down for automobiles, a strap inclosing a part of an automobile and anchored at its lower ends to a transportation support at opposite sides of the engaged part of the automobile and in the line of pulling strains thereof, means for anchoring the upper end of the strap to the automobile part, said strap being of inverted substantially V-shaped formation including upwardly converging side legs, said means being positioned below the engaged part of the automobile and adapted to draw the upper ends of the legs toward each other to render the same taut and to combine the upper end of the strap on the engaged part of the automobile, and the upper end of the strap being of a configuration similar to the engaged part of the automobile, said means including a flexible tie between the upper ends of the legs.

In testimony whereof I affix my signature.

EDWARD S. EVANS.